United States Patent Office 2,712,998
Patented July 12, 1955

2,712,998

PROCESS FOR THE PRODUCTION OF A FERMENTATION BEVERAGE

Otto Vosseler, Schwaikheim, Germany

No Drawing. Application September 20, 1952,
Serial No. 310,735

11 Claims. (Cl. 99—29)

This invention relates to a process for the production of a new type of fermentation beverage by fermenting sugar-containing solutions in the presence of aromatic vegetable materials. According to the amount of sugar used the beverage may be considered as alcoholic, non-alcoholic or of low alcoholic content.

It is already known to produce fermentation beverages through the use of herbs. The most varied alcoholic beverages have been aromatized with seasoning herbs, as is known for example with vermouth, in the preparation of beer with hop extract and in the production of Combucha, Mogu or Teekwass with the aid of the South American maté tea. Also mint, camomile, ginger, balm-mint and the like have already been used to flavour alcoholic beverages.

It has been found, that a particularly palatable fermentation beverage can be obtained by fermenting sugar-containing solutions in the presence of aromatic vegetable materials or if desired of an extract of same prepared in a suitable manner with Endomyces-species of the group which comprises the *Endomyces magnusii,* Endomycopsis and *Sachsia suaveolens*. In the main ferments which ferment dextrose, laevulose, mannose, galactose, saccharose, and raffinose—either all together or in various combinations—are contemplated.

The process according to the invention is carried out in a particularly advantageous manner, if following the fermentation with Endomyces-types a further fermentation of the substrate is carried out with one of the known high-fermenting wine-yeasts, such as for example Bordeaux, Laurero, Tokay yeast or the like. In this manner one can process a larger amount of sugar-containing substrate in a shorter time and moreover this additional fermentation causes an increase of the fineness and smoothness of the beverage. The second fermentation with wine-yeasts can if desired also be effected under the pressure of the carbonic acid gas developed during fermentation and indeed either in a closed tank or in the bottle, whereby champagne-like products can be obtained.

Under aromatic vegetable materials in the sense of the present invention are not only to be understood those vegetable materials, whose aromatic character makes itself externally noticeable through smell or taste but also such materials, which only develop aromatic substances during the fermentation.

A very palatable beverage can be produced by using the mentioned Endomyces-types with numerous plants, which are available in almost any desired quantities, such as for example, the leaves of the Cupuliferae or Rosaceae. The hazelnut tree, the oak, the beech, the wild briar (dog rose), strawberry, raspberry, blackberry belong to the named plant families and among them are also to be found plants of less pronounced aroma.

In the carrying out of the process according to the invention it is important that the fermentation of the sugar-containing solutions with the mentioned Endomyces-types takes place in the presence of the aromatic vegetable materials or of extracts of the same. There develop then through esterification or other chemical exchange action between the substances contained in vegetable materials and the metabolic products of the fungus particular taste and odour-substances, which give the beverage an agreeable taste, which can neither be obtained with the mould alone, nor through subsequent addition of an extract of the vegetable materials concerned to the fermentation product. Such fermentations in the presence of vegetable aroma carriers are already known, but lead to no result or to a much less good result when using the otherwise common fermentative agents, particularly when using vegetable materials without a pronounced aromatic character. The subsequent second fermentation with a wine yeast contributes particularly to giving the beverage the specific characteristics.

When carrying out the process according to the invention it has proved particularly advantageous to mix the fermentation substrate with cold water, because the delicate scents and the vitamins contained in the herbs are then not destroyed.

In the application of the process according to the invention alcohol-free or low alcohol beverages can also be produced, i. e. beverages with an alcohol content below 0.5%, if the sugar content of the sugar-containing solutions used is correspondingly kept low, e. g. below 1 kg. per hectoliter. It may in this case be adviseable to interrupt the fermentation prematurely by pasteurization or germ-free filtration. It has surprisingly proved that the beverage obtained is distinguished by a stimulating palatableness in spite of its lack of alcohol and tastes considerably better than known non-alcoholic products.

Solutions of cane or beetsugar, hydrolyzed starch solutions, wood sugar solutions, sugar-containing extracts of vegetable or animal origin, such as for example carrot extracts, honey, furthermore enzymatic degradation products, starch or inulin containing natural products, such as grain-types, "de-bittered" horsechestnuts, acorns, tobinambur, chicory and the like as well as by-products, e. g. beet and canesugar molasses, centrifuged syrup from wood and starchsugar production and the like, can be used as sugar-containing solutions.

The first fermentation with the Endomyces-types according to the invention is advantageously carried out in a closed vessel at about 25° C. The bung pressure can if desired be raised to about 3 atmospheres and if need be even higher, with the result that the carbon dioxide is forced to remain to a large extent in the liquid and thus contributes to the development of a fizzy character. After about 5 days the first fermentation is interrupted and the product, separated by appropriate means from the vegetable and other solid components, is subjected to a second fermentation under pressure (3 atm. or more) with one of the above mentioned wine-yeasts. The fermentation liquor is then advantageously left to mature for another 3–7 days at a temperature of 1–5° C. A weak subsequent sweetening of the filtered beverage which has been drawn off through a counter-pressure racker with e. g. 2 ccm. of 1% saccharine solution per litre is advisable especially with non-alcoholic or alcoholically poor beverages. However it is a part of the process that by an earlier or later interruption of the second fermentation a certain desired residual sugar-content can be left in the finished beverage.

The beverage produced according to the process of the invention can be kept for months without the addition of preservatives; it is capable of being produced resistant to tropical conditions and has an attractive wine-yellow colour.

In order that the invention may be well understood the following examples are given only as illustrations.

*Example 1*

0.5 kg. of a mixture of disintegrated dried leaves consisting of 1 part beech leaves, 2 parts dogrose leaves, and 2 parts blackberry leaves are worked with cold water and good mechanical stirring into a mash which for thorough soaking is allowed to stand for one hour. Then 5 kg. of sugar together with ¾ hectoliter of water are added and thoroughly mixed by stirring. To the mixture are added 100 g. of damp *Endomyces magnusii* and the volume made up to a hectoliter. The charge is left to ferment for 8 days under a pressure of about 3 atm., whereupon after filtration and addition of 100 g. of Tokay yeast the fermentation is completed under atmospheric pressure. After three days of maturing at a temperature of 1–5° C. the liquor is filtered and drawn off under counter-pressure. To the bottles to be filled 0.01 g. of saccharin per 0.5 litre are pre-introduced.

However, one can also carry out the second fermentation with the wine-yeasts in a pressure vessel or in the bottle. Whilst when the second fermentation is carried out under a pressure of up to 3 atm. a more cuplike beverage results, a champagne-like beverage is obtained if the second fermentation is carried out at a pressure higher than 3 atm.

*Example 2*

If instead of 5 kg. only 1 kg. of sugar is used and one otherwise proceeds as indicated in Example 1, an alcoholically poor fermentation beverage of refreshing, stimulating taste is obtained.

*Example 3*

0.7 kg. of a mixture of disintegrated dried leaves consisting of one part beech leaves, 3 parts dogrose leaves and 3 parts raspberry leaves, are worked with cold water and good mechanical stirring into a mash which for thorough soaking is left to stand for about one hour. Then 5 kg. sugar together with ¾ hectoliter water are added and thoroughly mixed by stirring. 100 g. of damp *Sachsia suaveolens* are added to the mixture which is made up to one hectoliter. The charge is left to ferment for 8 days at a pressure of about 3 atm., and for 5 days to mature at a temperature of 1–5° C. Then the liquor is passed through a counter-pressure filter to the filling machine and 2 g. of saccharin is pre-introduced into the filling container.

*Example 4*

If instead of 5 kg. only 1 kg. sugar is used and one proceeds otherwise as indicated in Example 3, one obtains an alcoholically poor fermentation beverage of refreshing, stimulating taste.

*Example 5*

Instead of the mixture used in Examples 1 and 2 of 1 part beech leaves, 2 parts dogrose leaves and 2 parts blackberry leaves the following mixtures of vegetable materials can also be employed:

(a) 0.7 kg. of dried raspberry leaves
(b) 1 kg. of a mixture of 450 g. raspberry leaves, 450 g. blackberry leaves, 100 g. hazelnut leaves
(c) 0.7 kg. of a mixture of 1 part oak leaves and 1 part strawberry leaves
(d) 0.5 kg. of a mixture of 1 part raspberry leaves and 1 part blackberry leaves The production of the fermentation beverage proceeds according to the method described in Example 1.

*Example 6*

Instead of the mixture of 1 part beech leaves, 3 parts dogrose leaves and 3 parts raspberry leaves used in Examples 3 and 4 the following mixtures of vegetable materials can also be used:

(a) 0.7 kg. of dried blackberry leaves
(b) 1 kg. of a mixture of 450 g. raspberry leaves, 450 g. blackberry leaves and 100 g. hazelnut leaves
(c) 0.7 kg. of a mixture of 1 part oak leaves and 1 part strawberry leaves One operates according to Example 3 with *Sachsia suaveolens*. Thereupon the second fermentation is carried out in a pressure vessel or in the bottle with one of the mentioned wine yeasts, as indicated in Example 1.

*Example 7*

1 kg. of a mixture of disintegrated dried leaves (herbs and plant parts) consisting of
1 part currant leaves, 3 parts strawberry leaves and 3 parts apple leaves, or
1 part mountain ash leaves, 3 parts balm leaves and 3 parts lime leaves with flowers are worked with cold water and good mechanical stirring into a mash, which is left to stand for an hour for the purpose of soaking through. Then 5 kg. of sugar with ¾ hectoliter of water are added and thoroughly mixed by stirring. 100 g. of damp *Endomycopsis fibuliger* of the species Endomycopsis are added to the mixture, which is made up to one hectoliter. The charge is left to ferment at a pressure of about 3 atm. at about 25° C. The fermentation is interrupted after about 5 days and the fermented liquor is filtered and freed by appropriate means from the vegetable and other solid components. Thereupon the liquor is left to mature for another 3–7 days at a temperature of 1–5° C., whereupon the finished beverage is drawn off through a counter-pressure filter. If desired, 0.01 g. of saccharin per 0.5 litre may be pre-introduced into the bottles to be filled.

If desired the second fermentation with wine yeast can be undertaken in a pressure vessel or in the bottle. The additional fermentation results in an increase of the alcohol content, the fineness and smoothness of the beverage. In this case one starts a second fermentation by adding a high-fermenting wine yeast, e. g. Tokay or Laurero yeast, after completion of the first fermentation and proceeds as indicated in Example 1.

*Example 8*

If instead of 5 kg. only 1 kg. of sugar is used and one proceeds otherwise according to Example 7, then one obtains an alcohol-poor fermentation beverage of refreshing, stimulating taste.

What I claim is:

1. A process for the production of beverages which comprises introducing into an aqueous medium a substance taken from the class consisting of the leaves of aromatic vegetable materials, extracts from said leaves and mixtures of said leaves and extracts, dissolving a sugar in said medium, introducing a ferment taken from the class consisting of *Endomyces magnusii*, Endomycopsis, and *Sachsia suaveolens*, and fermenting the above composition.

2. A process according to claim 1 in which the aromatic materials are taken from the class consisting of Cupuliferae (Culiferaceae) and Rosaceae.

3. A process according to claim 2 in which there is added a yeast and a second fermentation is conducted therewith.

4. A process according to claim 3 in which said second fermentation is conducted under superatmospheric pressure.

5. A process according to claim 2 in which said aqueous medium is cold.

6. A process according to claim 2 in which said fermentation is conducted for several days.

7. A process according to claim 2 in which the fermented mass is filtered.

8. A process according to claim 2 in which a synthetic sweetening agent is added to the fermented mass.

9. A process according to claim 2 in which saccharine is added to the fermented mass.

10. A process according to claim 2 in which said fermentation is interrupted to allow some of the sugar to remain in the fermented mass.

11. A process according to claim 2 in which said fermentation is conducted so that the alcohol content of the fermented mass is not over 0.5%.

References Cited in the file of this patent

FOREIGN PATENTS

| | | |
|---|---|---|
| 2,486 | Great Britain | of 1857 |
| 15,613 | Great Britain | Nov. 20, 1913 |

OTHER REFERENCES

Home Made Beverages, by Alfred A. Hopkins, pub. 1919 by the Scientific American Publishing Co., New York, pages 157-9.

Microorganisms and Fermentation, by Alfred Jorgensen and Albert Hansen, published 1948, by Charles Griffin Co., Lmtd., London, pages 207-8.

Henricis Molds, Yeast, and Actinomycetes, 2nd edition, by Charles E. Skinner, et al., published 1930 by John Wiley & Sons, Inc., New York; pages 21, 22, 273, 274, 276, 282, 337.